United States Patent
Rink

Patent Number: 6,068,341
**Date of Patent: *May 30, 2000**

[54] BELT RETRACTOR FOR INCORPORATING IN A FOLD-DOWN TYPE BACKREST

[75] Inventor: Jürgen Rink, Waldstetten, Germany

[73] Assignee: TRW Occupant Restraint Systems GmbH & Co. KG, Alfdorf, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/196,454

[22] Filed: Nov. 19, 1998

[30] Foreign Application Priority Data

Nov. 24, 1997 [DE] Germany .................. 297 20 818 U

[51] Int. Cl.$^7$ .................................................. B60R 22/34
[52] U.S. Cl. ........................ 297/483; 297/378.12; 297/478
[58] Field of Search ...................... 297/354.12, 366–368, 297/378.12, 475, 478, 483

[56] References Cited

U.S. PATENT DOCUMENTS

| | | | |
|---|---|---|---|
| 4,610,480 | 9/1986 | Yamada et al. ........................ | 297/478 |
| 5,071,194 | 12/1991 | Fohl ........................................ | 297/478 |
| 5,660,444 | 8/1997 | Thomas ........................... | 297/354.12 X |
| 5,839,790 | 11/1998 | Doty ....................................... | 297/478 |
| 5,882,084 | 3/1999 | Verellen et al. ..................... | 297/483 X |

FOREIGN PATENT DOCUMENTS 2927159 2/1981 Germany .

*Primary Examiner*—Peter R. Brown
*Attorney, Agent, or Firm*—Tarolli, Sundheim, Covell, Tummino & Szabo L.L.P.

[57] ABSTRACT

A belt retractor for incorporation in a fold-down type backrest of a vehicle seat is disclosed. The backrest of the seat is able of being latched to a vehicle body in an upright seating position by a lock. The retractor has a frame and a belt reel rotatably mounted in the frame. A blocking mechanism is provided for selectively blocking rotation of the belt reel on the frame. The blocking mechanism is activated as long as the backrest is not locked in place by latching action of the lock. The blocking mechanism comprises an activating means responsive to inertial forces. The activating means has a coupling disk which is connected to the belt reel and has a coupling toothing. The activating means further has a coupling pawl which can be caused to engage the coupling toothing. The coupling pawl comprises a control knuckle coupled by a traction means to the lock.

2 Claims, 3 Drawing Sheets

6,068,341

BELT RETRACTOR FOR INCORPORATING IN A FOLD-DOWN TYPE BACKREST

FIELD OF THE INVENTION

The invention relates to a belt retractor for incorporating in a fold-down type backrest which can be latched to the vehicle body in the upright seating position by a lock, including a belt reel rotatably mounted in a frame and a blocking mechanism for selectively blocking rotation of the belt reel on the frame.

When the belt retractor is not secured directly to the vehicle body but to a backrest, the belt forces are introduced into the vehicle body via the backrest and its anchorage. A fold-down type backrest needs to be latched to the vehicle body so that it can take the belt forces and transfer them into the vehicle body. Latching a fold-down type backrest to the vehicle body is done by means of a lock which automatically locks in place on attaining the upright seating position of the backrest.

SUMMARY OF THE INVENTION

Since the seat belt is unable to satisfy its restraint function when the lock has failed to fully latch in place the invention proposes activating the blocking mechanism of the belt retractor as long as the backrest is not locked in place by latching action of the lock. When the blocking mechanism is activated no belt webbing can be withdrawn from the belt retractor. The seat belt can thus not be fastened as long as the backrest is not latched to the vehicle body, thus making it impossible for the seat belt to be fastened without it providing its restraint capability.

In the preferred embodiment of the belt retractor the blocking mechanism is provided with a vehicle-sensitive activating means comprising a coupling disk which is connected to the belt reel in a manner known per se and carries a coupling toothing, and comprising a coupling pawl which can be caused to engage the latter. The coupling pawl is lifted by an inertial sensor by known ways and means and is caused to engage the coupling toothing. In addition the coupling pawl is provided with a control knuckle which is coupled to the lock on the backrest by a traction means. The coupling pawl which is present in any case is thus made use of to also latch the belt retractor as a function of the lock condition. Accordingly, the latching function in accordance with the invention can be easily retrofitted to existing and proven retractor designs.

In a further development of the invention provision is made that the pulling means swivels an actuating lever acting on the control knuckle of the coupling pawl. This actuating lever is arranged between two compression springs, the first of which is supported by an end part secured to the free end of the traction means and the second is supported by a sleeve surrounding the pulling means. By arranging the actuating lever between two compression springs an excess stroke of the traction means is permitted as a result of which tolerances are compensated and there is no need for an adjustment.

BRIEF DESCRIPTION OF THE DRAWINGS

Further features and advantages of the invention are evident from the following description of one embodiment of the invention from the drawing to which reference is made and in which.

DESCRIPTION OF THE SPECIFIC EMBODIMENT

Figure 1:
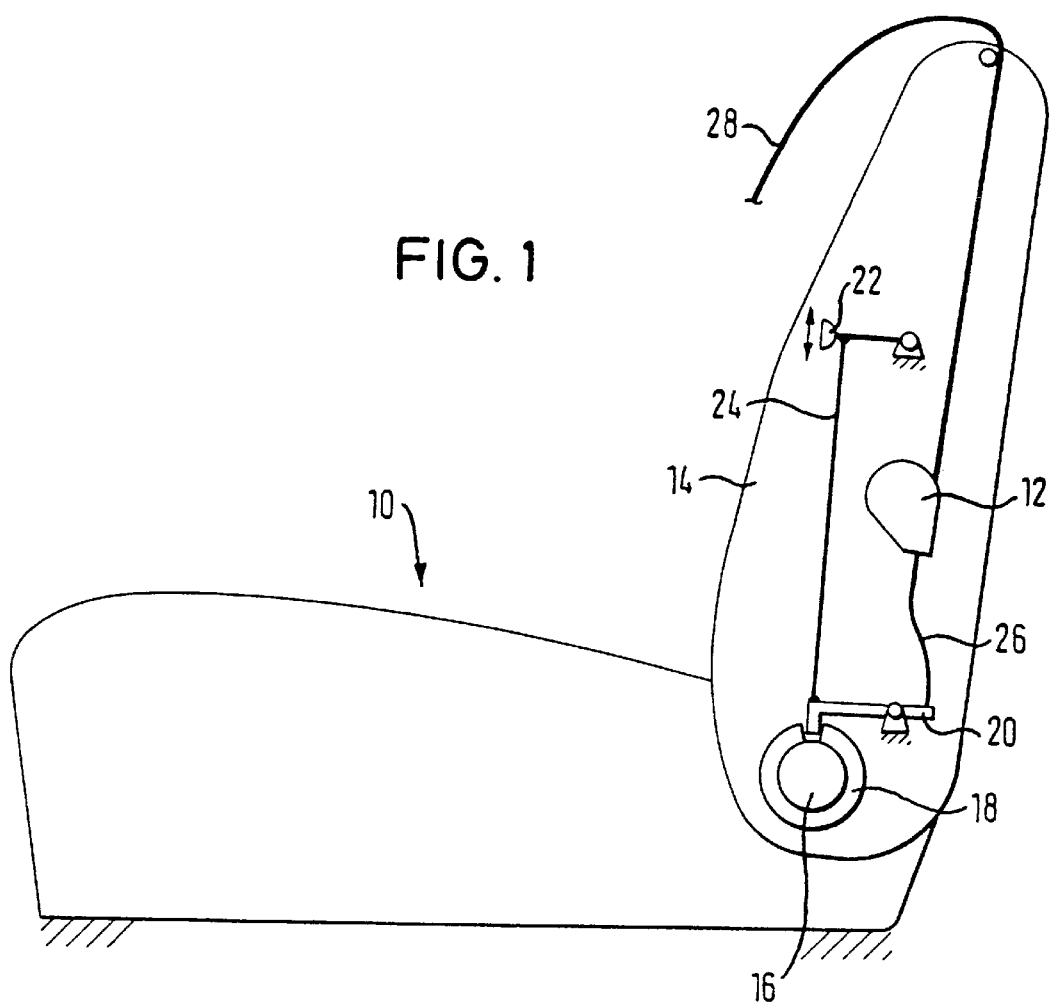
FIG. 1 is a schematic illustration of a vehicle seat incorating the belt retractor in accordance with the invention.

The schematic illustration as shown in FIG. 1 shows a vehicle seat 10 incorporating a belt retractor 12 in accordance with the invention. The belt retractor 12 is arranged in the backrest 14 of the vehicle seat 10, which backrest is connected by a rotary joint 16 to the seat part and thus to the vehicle body. The backrest 14 can be hinged about the rotary joint 16 and is latched in place in its upright seating position as shown in FIG. 1 by a lock. The lock is indicated schematically by a disk 18 arranged concentrically about the rotary joint 16 and fixedly connected to the seat part, and a moving function part, a latch bolt 20. The disk 18 comprises a recess which is engaged by the latch bolt 20 swivably mounted in the backrest 14. The backrest 14 can be released and subsequently folded down by the latch bolt 20 being moved out of the recess in the disk 18. This is done by a latch release lever 22 connected with the latch bolt via a cable pull 24. The latch bolt 20 is configured as a double-ended lever, the one end of which is engaged by the cable pull 24 and the other end of which is engaged by a cable pull 26 which is in connection with the belt retractor 12. When the latch bolt 20 is moved out of the recess in the disk 18 by an upward movement of the latch release lever 22, the blocking mechanism of the belt retractor 12 is activated at the same time by the cable pull 26. When the latch bolt 20 is not engaging the recess in the disk 18, no belt webbing 28 can thus be withdrawn from the belt retractor 12.

Figure 2:
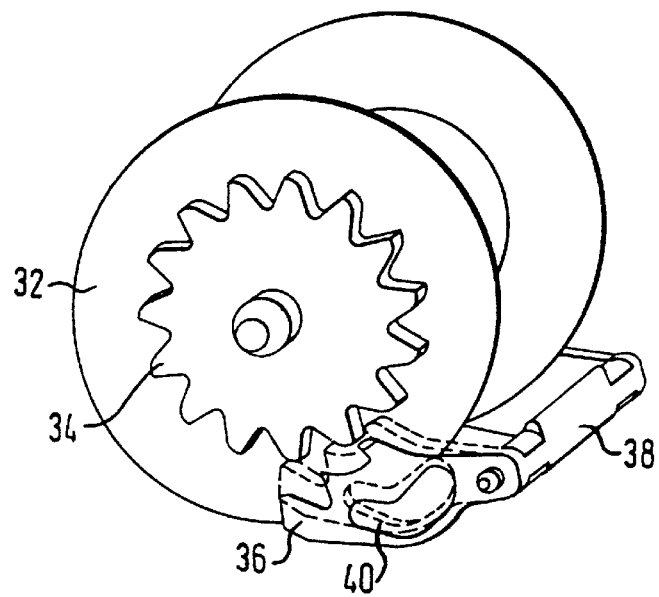
FIG. 2 is a perspective section view of a blocking mechanism of the belt retractor.

The belt retractor 12 comprises a frame 30 in which a belt reel 32, as shown in FIG. 2, is rotatably mounted. The belt retractor 32 comprises at each of its side flanges ratchet teeth 34 which can be engaged each by one of the two ratchet pawls 36. As is evident from FIG. 2 the ratchet pawls 36 are connected to each other by a web 38 and they are swivably mounted at the frame 30 of the belt retractor 12. To bring the ratchet pawls 36 into engagement with the ratchet teeth 34, a vehicle-sensitive activating mechanism is provided. This vehicle-sensitive activating mechanism engages via a control lever (not shown) a control link 40 on the side of one of the pawls 36.

The vehicle-sensitive activating mechanism essentially comprises an outer toothed coupling disk 42 non-rotatably connected to the belt reel, an inertia sensor in the form of a weight ball 44 and a coupling pawl 46 resting on the ball 44 and swivably mounted. The coupling pawl 46 can be caused by the weight ball 44 to engage the coupling toothing on the outer circumference of the coupling disk 42.

Mounted on the coupling pawl 46 is a laterally protruding control knuckle 48. An actuating lever 52 swivably mounted about an axis 50 cooperates by its free end with the control knuckle 48. The actuating lever 52 is disposed between two compression springs 54, 56. The compression spring 54 is supported between the actuating lever 52 and an end part 60 mounted on the end of the traction cable 58 of the cable pull 26. The compression spring 56 is supported between the actuating lever 52 and the sleeve 62 of the cable pull 26.

Figure 3:
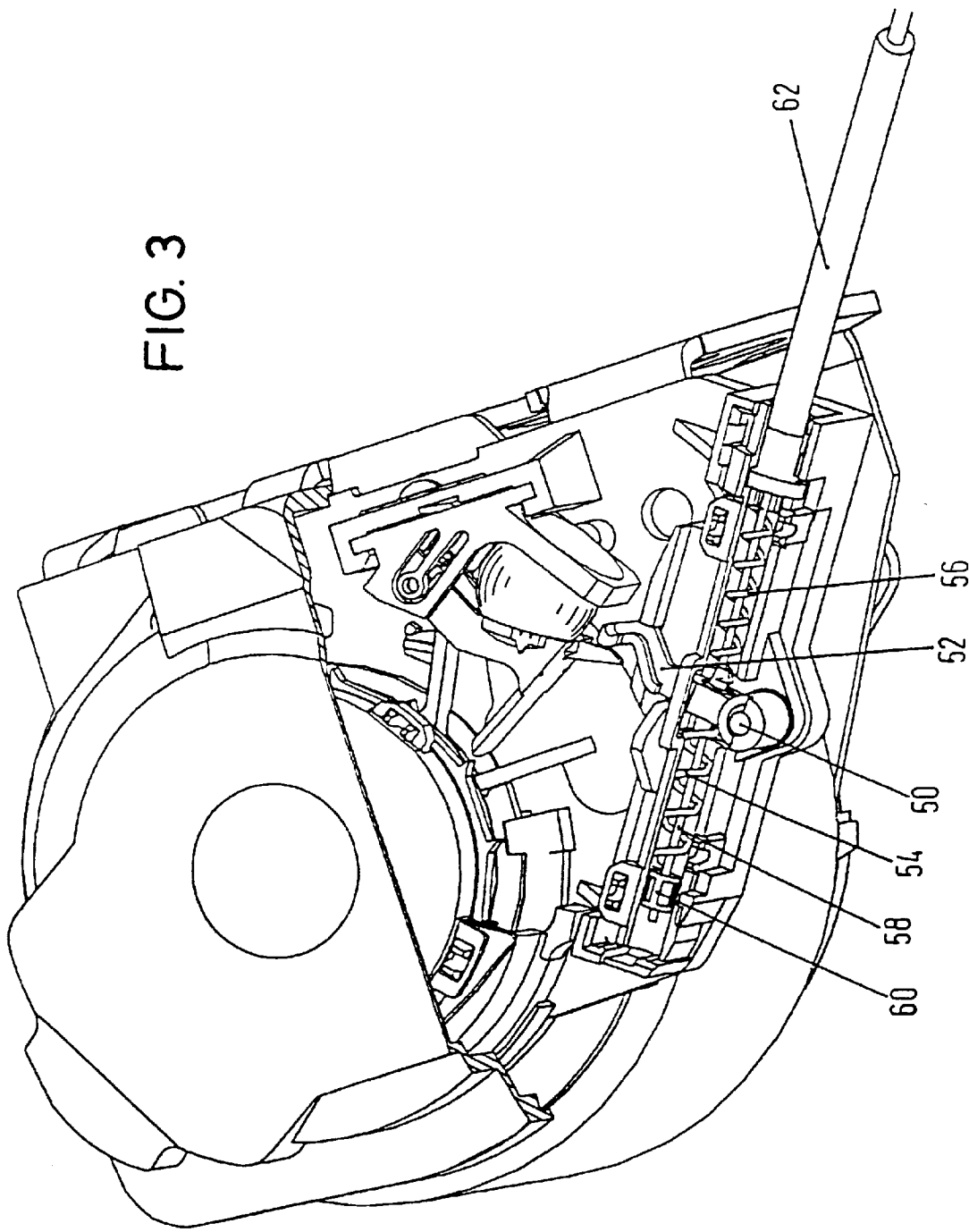
FIG. 3 is a perspective view of the belt retractor in accordance with the invention shown in a partly sectioned illustration with the backrest latched in place.
Figure 4:
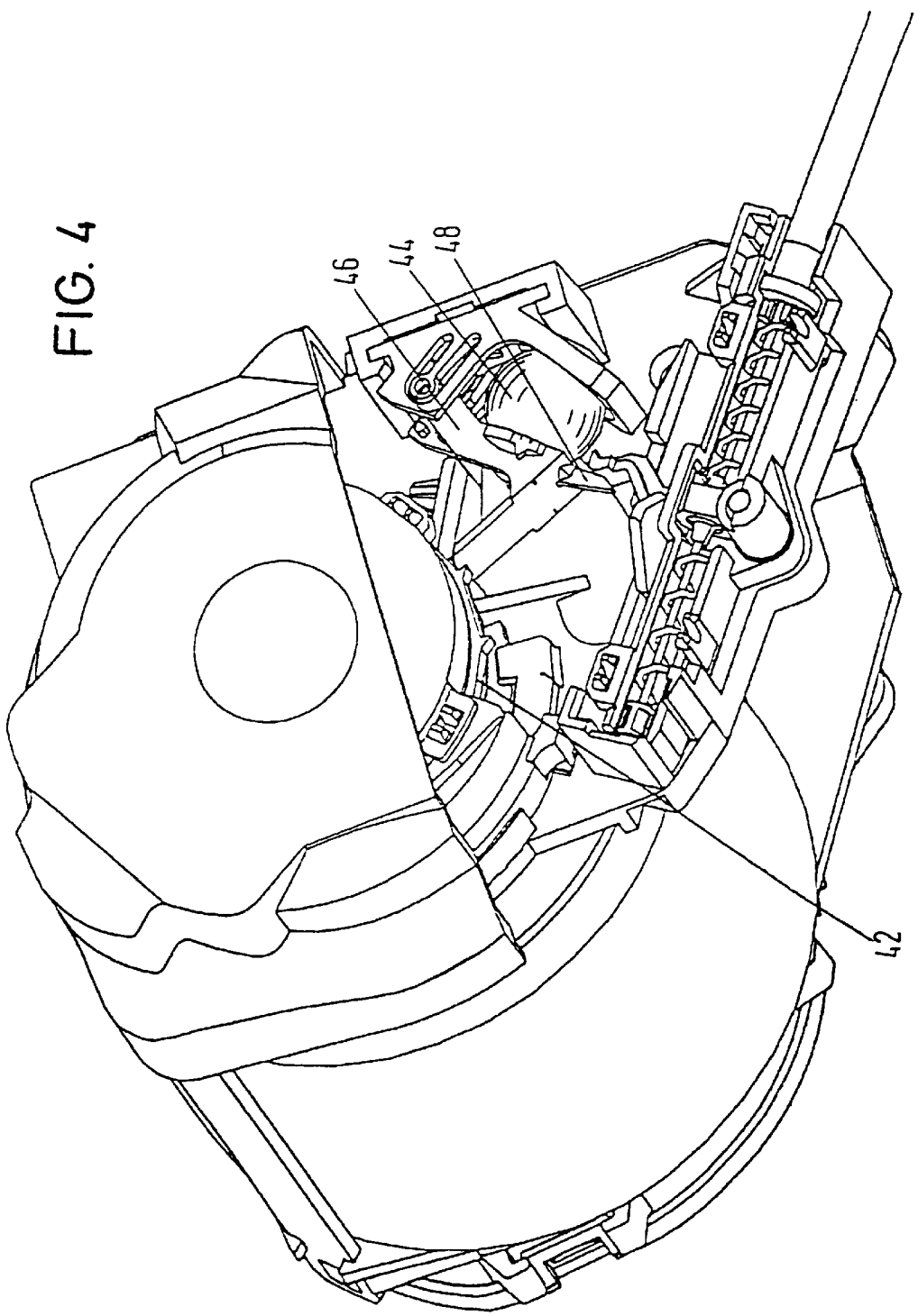
FIG. 4 illustrates the belt retractor as shown in FIG. 2 with backrest not latched in place.

In the normal position as shown in FIG. 3 the latch bolt 20 is locked in place and the traction cable 58 tensioned, as a result of which the actuating lever 52 is swivelled via the compression spring 54 into a position in which its free end is spaced away from the control knuckle 48 of the coupling pawl 46. If the latch bolt 20 fails to be fully locked in place the actuating lever 52 is urged against the control knuckle 48 via the compression spring 56 as is evident from FIG. 4, resulting in the coupling pawl 46 being lifted and caused to engage with the coupling toothing on the circumference of the coupling disk 42. When the belt webbing is then withdrawn from the belt reel the blocking mechanism is activated in the same way as is in vehicle-sensitive activating.

I claim:

1. Apparatus comprising:

a vehicle seat having a fold-down backrest;

a manually actuatable backrest lock having a locked condition locking said backrest in an upright position;

an actuator for manually actuating said backrest lock;

a seat belt retractor mounted within said backrest, said belt retractor including a belt reel rotatably mounted in a frame, said belt retractor further including a blocking mechanism which is coupled to said belt reel on said frame which is actuatable to block rotation of said belt reel relative to said frame, and;

a connecting means coupling said lock to said blocking mechanism, said connecting means enabling said blocking mechanism to be activated when said backrest is not locked in an upright position by said lock;

said blocking mechanism comprising an activating means responsive to inertial forces including a vehicle-sensitive inertial mass coupled to a coupling disk, said coupling disk being connected to said belt reel and having a coupling toothing, said blocking mechanism further including a coupling pawl adapted to engage said coupling toothing, and said coupling pawl comprising a control knuckle coupled with said lock by a traction means of said connecting member, so that activation of said blocking mechanism by said coupling pawl engaging said toothing of said coupling disk is obtained both by activation of said activating means and also by the latching action of said lock, said blocking mechanism further including an actuating lever for coupling said traction means to said control knuckle, said traction means engaging said actuating lever to pivot said actuating lever to move said control knuckle.

2. Apparatus as set forth in claim 1, wherein said blocking mechanism comprises an activating means responsive to inertial forces including a vehicle-sensitive inertial mass coupled to a coupling disk, said coupling disk being connected to said belt reel and having a coupling toothing, said blocking mechanism further including a coupling pawl adapted to engage said coupling toothing, and said coupling pawl comprising a control knuckle coupled with said lock by a traction means of said connecting member, so that activation of said blocking mechanism by said coupling pawl engaging said toothing of said coupling disk is obtained both by activation of said activating means and also by the latching action of said lock.

* * * * *

UNITED STATES PATENT AND TRADEMARK OFFICE
CERTIFICATE OF CORRECTION

PATENT NO. : 6,068,341
DATED : May 30, 2000
INVENTOR(S) : Jurgen Rink

It is certified that error appears in the above-identified patent and that said Letters Patent is hereby corrected as shown below:

Column 4,
Line 16, delete claim 2 and insert as follows:
2. Apparatus as set forth in claim 1, wherein said actuating lever is located between and engaged by a first compression spring and a second compression spring, said first and second compression springs being opposed to each other, said first compression spring being supported by an end part secured to a free end of said traction means and said second compression spring being supported by a sleeve surrounding said traction means.

Signed and Sealed this

Sixteenth Day of July, 2002

Attest:

Attesting Officer

JAMES E. ROGAN
*Director of the United States Patent and Trademark Office*